(12) United States Patent
Ho et al.

(10) Patent No.: US 6,305,759 B1
(45) Date of Patent: Oct. 23, 2001

(54) TRAILER ABS MODULATOR WITH DIRECT EXHAUST AND CONTROL LINE/VOLUME DRAIN CAPABILITY

(75) Inventors: Thanh Ho, Brunswick; Robert J. Herbst, Avon, both of OH (US)

(73) Assignee: AlliedSignal Truck Brake Systems Company, Elyria, OH (US)

( * ) Notice: Subject to any disclaimer, the term of this patent is extended or adjusted under 35 U.S.C. 154(b) by 0 days.

(21) Appl. No.: 09/136,712

(22) Filed: Aug. 19, 1998

(51) Int. Cl.[7] .......................................................... B60T 8/34
(52) U.S. Cl. ............................ 303/118.1; 303/69; 303/15
(58) Field of Search .................................. 33/118.1, 119.1, 33/113.1, 123, 15, 68, 69, 28, 29, 30, 119.2, 119.3, 127; 137/627.5, 596.17, 244, 237, 204; 188/352

(56) References Cited

U.S. PATENT DOCUMENTS

| | | |
|---|---|---|
| 3,854,501 | 12/1974 | Machek . |
| 3,881,779 * | 5/1975 | Machek ............................. 303/118.1 |
| 4,715,666 | 12/1987 | Farr . |
| 4,861,115 * | 8/1989 | Petersen ................................... 303/15 |
| 4,915,459 | 4/1990 | Hashida et al. . |
| 5,058,961 | 10/1991 | Mergenthaler et al. . |
| 5,190,359 | 3/1993 | Egerton . |
| 5,310,253 | 5/1994 | Beck . |
| 5,312,175 | 5/1994 | Ando et al. . |
| 5,395,164 * | 3/1995 | Sulzye ..................................... 303/15 |
| 5,709,246 * | 1/1998 | Koelzer ............................. 137/627.5 |
| 5,713,641 | 2/1998 | Hosoya . |
| 5,762,094 * | 6/1998 | Hendershot et al. ................. 137/204 |
| 5,897,174 * | 4/1999 | Ehrlich ................................... 303/40 |
| 5,947,239 * | 9/1999 | Koelzer ............................. 137/627.5 |
| 5,979,503 * | 11/1999 | Abboud et al. .................... 137/627.5 |

* cited by examiner

Primary Examiner—Douglas C. Butler

(57) ABSTRACT

A self-cleaning feature is provided for a trailer ABS modulator. Direct exhaust is provided through the piston or diaphragm to establish control line and control volume drain capabilities. This provides for moisture removal from the control line or control volume. Quick exhaust during normal service braking is also improved and, likewise, exhaust during the ABS mode is improved.

14 Claims, 3 Drawing Sheets

TRAILER ABS MODULATOR WITH DIRECT EXHAUST AND CONTROL LINE/VOLUME DRAIN CAPABILITY

BACKGROUND OF THE INVENTION

This invention relates to the art of braking systems, and more particularly to a trailer antilock brake system (ABS) modulator valve. The invention is particularly applicable to a tractor-trailer type vehicle equipped with an air braking system in which a vehicle operator generates a control signal to operate a brake control valve. The signal is transmitted to relay valves which, in response, communicate compressed air from storage reservoirs to vehicle brakes. It will be appreciated, however, that the invention may relate to similar environments and applications.

ABS brakes for these types of systems typically include an impermeable or solid walled piston or flexible diaphragm that selectively moves during normal service braking to establish communication with an exhaust passage. Although providing for effective normal service braking, the control line and control volume disposed on one side of the piston or diaphragm of an ABS modulator is less frequently in communication with an ABS exhaust passage. Since air is involved, moisture is always an attendant consideration. In other words, moisture can build up and remain in the control volume. Since ABS braking is less frequently used, the potential exists for blockage to occur at the ABS exhaust passage which is not desirable. The exhaust passage is necessarily exposed to ambient conditions such as ice, mud, etc., and if the exhaust passage is not frequently used, the passage could be less effective than desired.

On the other hand, normal service braking is frequently and necessarily employed. The separate exhaust passage associated with normal service braking in known vehicles has less problems associated with ice or mud since, whenever a brake application is released, the exhaust passage is used and likewise ice or mud expelled therefrom.

Known modulators also have an extended or longer exhaust passage since separate exhaust passages were used for normal service braking and ABS control events. Longer exhaust passages result in reduced response time during normal service braking.

Alternatively, known ABS braking systems for tractor trailer type vehicles are commercially successful and have been widely adopted and accepted in the industry. Thus, any improvement that addresses these concerns would necessarily be attractive if can be easily incorporated into the existing structure without substantial modification.

SUMMARY OF THE INVENTION

The present invention contemplates a new and improved ABS modulator for a tractor trailer that has direct exhaust and control line and control volume drain capabilities and which overcomes all of the above-referenced problems and others in a simple, economical manner that is achieved without drastic modification of the existing structure.

According to the present invention, a valve member received in a valve assembly housing is movable between first and second positions to control communication between the supply port, delivery port, and exhaust port. A solenoid valve assembly associated with an ABS feature communicates with a common exhaust to improve quick exhaust during normal service braking and improve exhaust during an antilock braking event.

According to another aspect of the invention, the solenoid valve assembly communicates with the exhaust port through the valve member.

According to still another aspect of the invention, a portion of the antilock braking system is in constant communication with the exhaust port.

According to yet anther aspect of the invention, the solenoid valve assembly is a non-flow through arrangement where only one end thereof is in communication with the system pressure.

A principal advantage of the invention is the ability to provide a direct exhaust for the ABS modulator.

Another advantage of the invention resides in the ability to drain the control line or control volume associated with the ABS modulator, particularly on a more frequent basis.

Still another advantage of the invention is the improved exhaust during ABS mode of braking.

Yet another advantage of the invention is associated with the common control exhaust for the solenoid valve assembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENT

Figure 2:
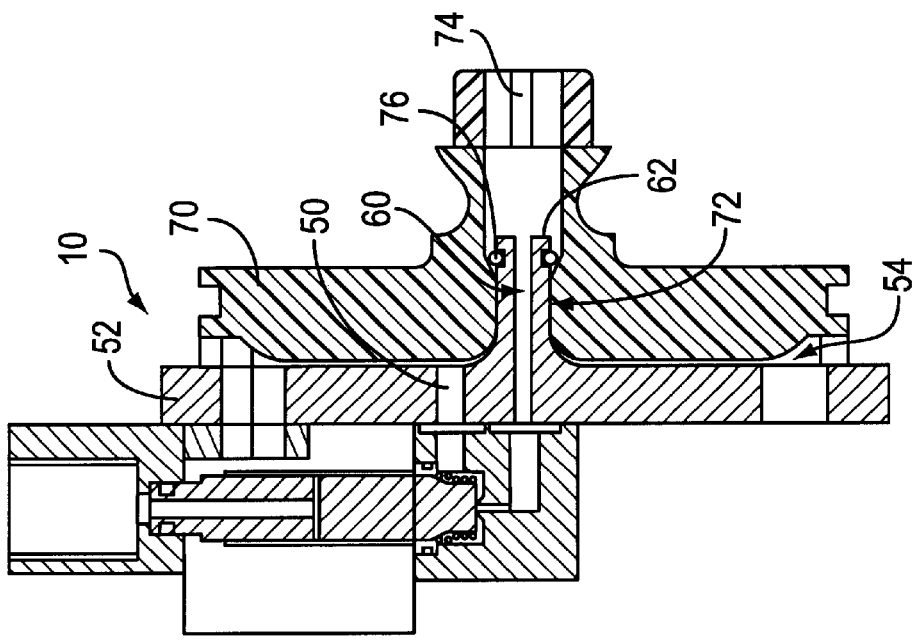
FIG. 2 is a cross-sectional view taken generally along the lines 2—2 of FIG. 1.
Figure 1:
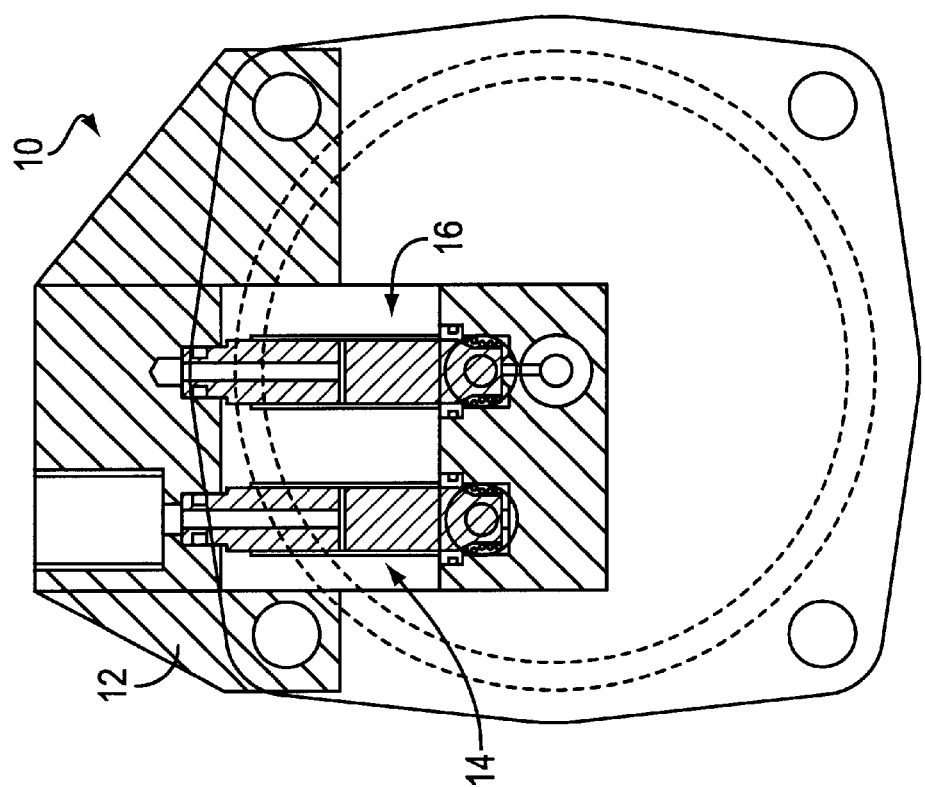
FIG. 1 is an elevational view, partly in section, of a trailer ABS-modulator.

Referring now to the drawings wherein the showings are for the purposes of illustrating the preferred embodiments of the invention only and not to limit the invention, the Figures show a trailer ABS-modulator A formed in accordance with the teachings of the present invention. More particularly, and with reference to FIGS. 1 and 2, an ABS modulator 10 is shown in greater detail. It includes a housing 12 that receives a first, or hold, valve assembly 14 and a second, or exhaust, solenoid valve assembly 16. The structure and operation of ABS brake assemblies of this type are well known to those skilled in the art so that only a brief discussion herein is necessary to a full and complete understanding of the present invention.

Generally, the solenoid control assembly provides for a rapid pulsing of the brake application during an antilock control event. If an antilock event is sensed, an electronic control unit (not shown) sends suitable signals to the solenoid valve assemblies 14, 16 associated with the modulator. The valve assemblies provide an electro-pneumatic interface between the electronic controller and the air brake system. If an impending wheel lockup is sensed, the antilock controller immediately begins to modify brake application using the modulator. Coils associated with the respective solenoid valve assemblies are energized or deenergized in a predetermined sequence by the controller. When the solenoid coil is energized, a core or shuttle is moved to either open or close an associated air passage. This either opens or closes the exhaust passage or reapplies air pressure to the brake actuator. Each of the solenoid valve assemblies is independently controlled by the electronic control unit. By opening and closing the solenoid valves, the antilock controller simulates brake "pumping" but at a rate substantially faster than the driver of a vehicle could actually pump the brakes to avoid skidding.

Figure 3:
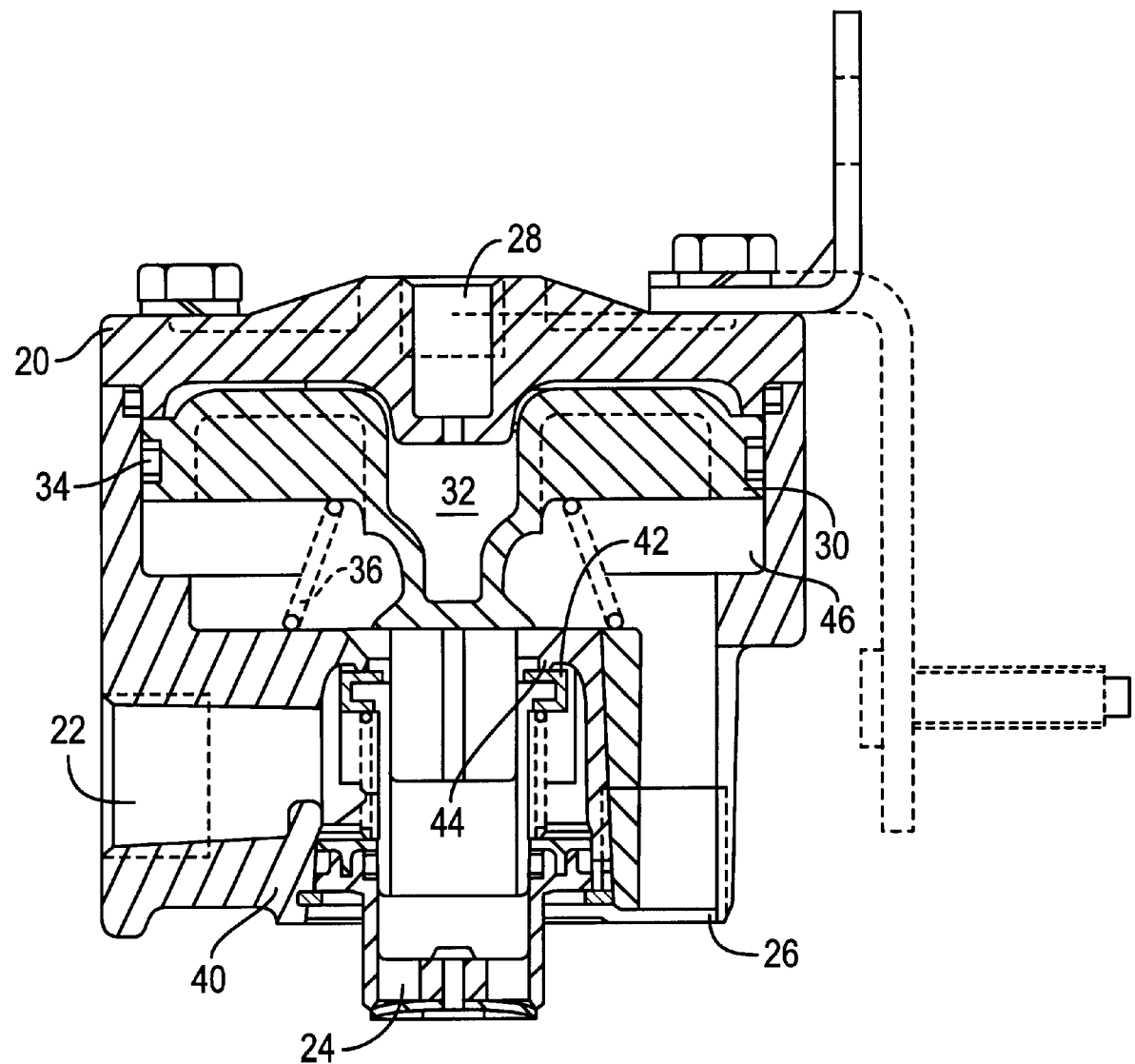
FIG. 3 is a cross-sectional view of a relay valve that receives the control signal from the modulator.

As will be appreciated, antilock events where impending wheel lockup is sensed are the exception rather than the norm during brake application. Thus, normal service braking is oftentimes adequate to bring the vehicle to an effective stop. With continued reference to FIGS. 1 and 2, and additional reference to FIG. 3, normal service braking in a trailer ABS system will be briefly described. As shown in FIG. 3, a relay valve housing 20 includes a supply port 22, an exhaust port 24, a delivery port 26, and a service port 28. The supply port 22 communicates with a source of compressed air (not shown), the exhaust port 24 communicates with ambient, and the delivery port 26 communicates with the brake actuators.

Service port 28 receives pressurized air when normal service braking is applied. This pressurizes the upper side of movable piston 30 received in cavity 32. The piston is sealed about its periphery by seal member or O-ring 34 engaging the interior wall of the housing that defines the cavity. A biasing member such as spring 36 normally urges the piston 30 toward the upper position as shown in FIG. 3. As the service port 28 pressurizes a first or upper side of the piston in the relay valve, the piston 30 moves downwardly to close the exhaust port 24. As will be appreciated, the delivery port 26 is normally in communication with the exhaust port 24 in the position shown in FIG. 3 and likewise the supply port and delivery port 26 are not in communication. Movement of the piston downwardly urges the inlet/exhaust valve assembly 40 downwardly to move a sealing surface 42 away from an inlet valve seat 44. This establishes communication between the supply port 22 and the delivery port 26 through volume 46.

Upon release of normal service braking, air is relieved on the upper side of the relay piston 30. The delivery air in cavity 46, and a spring assistance, urges the relay piston upwardly to the position shown in FIG. 3. Consequently, the delivery port 26 is connected to the exhaust port again as shown in FIG. 3.

Referring again to FIGS. 1 and 2, during normal service braking, service pressure also passes through the normally open, hold solenoid valve assembly 14. It passes through a passage 50 in housing wall 52 and communicates with control volume 54 defined on one side of the piston 70 of the ABS modulator. As briefly described above, when an antilock event is sensed, the hold solenoid assembly 14 is fired or closed and the exhaust solenoid assembly 16 is energized or opened. Opening the exhaust solenoid assembly advantageously establishes communication with an ABS exhaust passage 60 through the center of the hollow stem 62 extending from one face of the housing wall and through the center of the piston 70 in accordance with the teachings of the present invention. The hollow stem is dimensioned to define a drain passage between its exterior surface and a bore formed in the piston 70. That clearance defines a drain passage 72 that allows the control volume to communicate with the exhaust passage 74, a common exhaust, during normal service braking. A seal member such as O-ring 76 is provided at one end of the hollow stem to prevent commu-nication between the control volume 54 and the exhaust passage 74 when the piston 70 moves to an actuated position (i.e., rightwardly in FIG. 2).

Providing an ABS exhaust passage through what has previously been an impermeable, solid piston or diaphragm provides the following benefits. First, it adds a self-cleaning feature to the modulator assembly. That is, previously a separate exhaust passage was provided. Since antilock braking is less frequently used than normal service braking, then the potential existed for occlusion or blockage of the separate exhaust passage. For example, ice or mud could build up along this passage and limit the effectiveness of communication with the separate exhaust passage. However, by using a common exhaust for the ABS and normal service braking through provision of the ABS exhaust passage through a central portion of the piston or diaphragm, this assures that the exhaust passage is used during any brake application. This limits the chances that the exhaust passage will have a build up of ice, mud, etc. Moreover, this arrangement also provides for drainage of the control line, removing moisture which would otherwise build up in the control line. Quick exhaust is also improved during normal service braking, as well as improved exhaust during the ABS mode because of the shorter exhaust passages. This arrangement also provides for a common control exhaust for the solenoid valve assembly.

Figure 5:
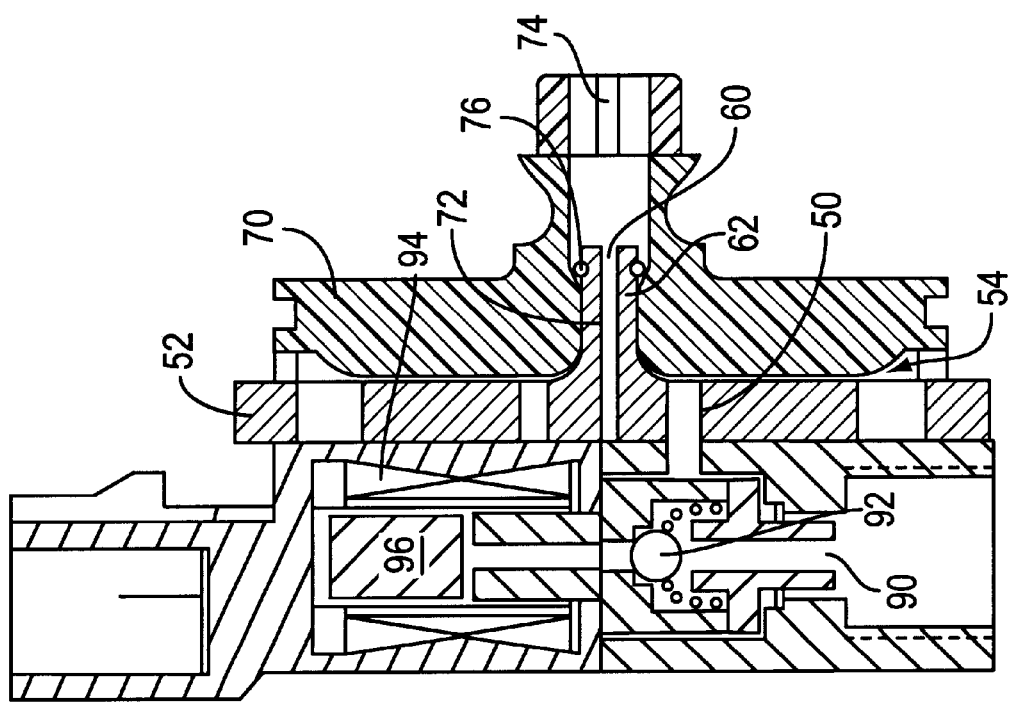
Figure 4:
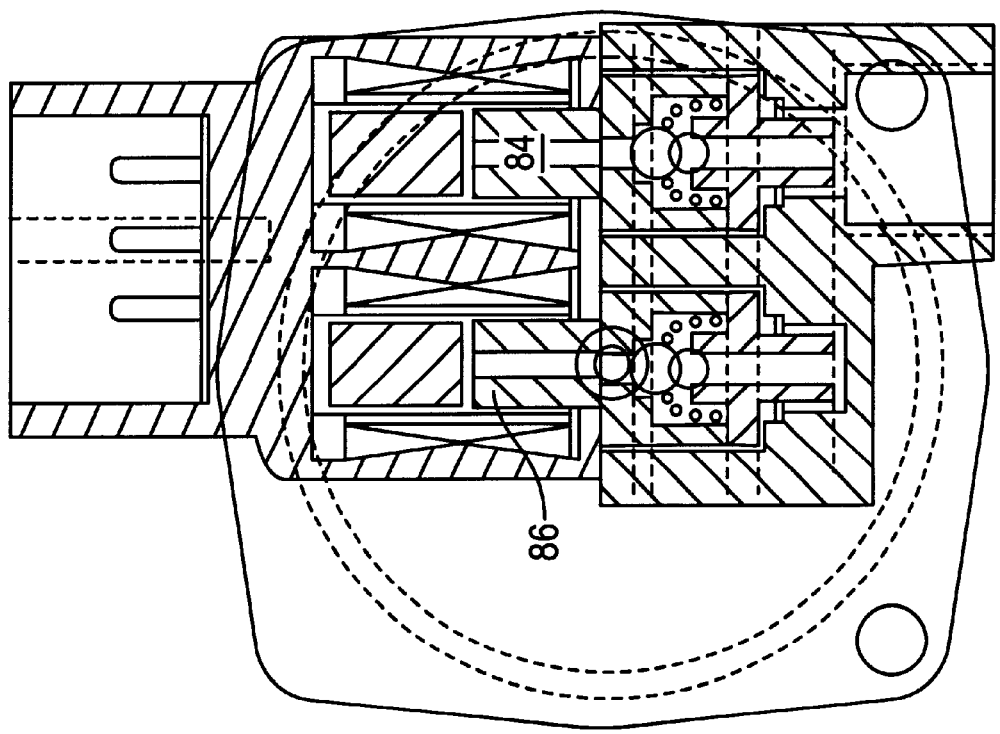
FIG. 4 is an elevational view, partly in section, of a second preferred embodiment of a trailer ABS modulator; and, FIG. 5 is a cross-sectional view taken generally along the lines 5—5 of FIG. 4.

FIGS. 4 and 5 illustrate a slightly modified version of the trailer ABS modulator. That is, non-flow through solenoid valve assemblies 84, 86 are provided in conjunction with the direct exhaust and control line/control volume drain capability described above in conjunction with FIGS. 1 and 2. Further details of the structure and operation of an ABS modulator employing non-flow through solenoid valve assemblies may be found in commonly owned, Ser. No. 09/108,053, filed Jun. 30, 1998, the disclosure of which is incorporated herein by reference. As will be appreciated, the hold solenoid valve assembly 84 is normally open so that service pressure can flow through passage 90, past the normally open valve member, shown here as a spring biased ball check valve 92, to communicate with the control volume 54 through passage 50. During an antilock control event, the coil 94 is energized, urging the plunger 96 downwardly as shown to move the valve to a closed position and prevent communication with the control volume. The second or exhaust solenoid valve assembly 86, on the other hand, is fired or energized to establish communication with the ABS exhaust passage 60 through the center of the piston/diaphragm. This provides for all the benefits and features described above with the embodiment of FIGS. 1 and 2 but in an alternative, simpler non-flow through solenoid valve arrangement.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A trailer ABS modulator valve assembly providing improved drainage of an ABS exhaust passage comprising:
   a housing having a supply port, a delivery port and an exhaust port;
   a movable valve member received in the housing and movable between first and second positions in response to normal service brake application for controlling communication between the supply port, the delivery port, and the exhaust port; and a solenoid valve assembly associated with antilock braking that communicates with the exhaust port through the valve member for selectively applying and exhausting pressurized air from the supply port to the delivery port and the exhaust port, respectively, in response to an antilock braking event.

2. The valve assembly of claim 1 wherein the valve member includes an opening in a central portion of the valve member for quick exhaust of the pressurized air from the solenoid valve assembly.

3. The valve assembly of claim 1 wherein the valve member includes a hollow stem that communicates with the solenoid valve assembly at one end and communicates with the exhaust port at the other end.

4. The valve assembly of claim 3 wherein the hollow stem is unrestricted and in constant communication with the exhaust port.

5. The valve assembly of claim 3 further comprising a seal member interposed between the hollow stem and the exhaust port that prevents communication between a control chamber on one side of the valve member and the exhaust port during normal service braking.

6. The valve assembly of claim 5 wherein the solenoid valve assembly is a non-flow through arrangement wherein only one end thereof is in communication with system pressure medium flow.

7. The valve assembly of claim 1 wherein the control volume includes first and second exhaust passages communicating therewith, the first passage directly connected to the exhaust port associated with the solenoid valve assembly.

8. A control valve for a brake system that removes condensation and contamination from an ABS exhaust passage comprising:

a housing;

a movable valve member defining a control volume on one side thereof which is adapted for connection to an associated supply of pressurized air for selectively actuating an associated braking system;

a solenoid valve assembly that selectively cycles brake application and release during an antilock braking event; and a common exhaust communicating with the control volume and the solenoid valve assembly for improving quick exhaust during normal service braking and improving exhaust during an antilock braking event.

9. The control valve of claim 8 wherein the valve member includes a passage therethrough that communicates with an exhaust solenoid valve at one end and an exhaust port in the housing at the other end.

10. The control valve of claim 8 wherein the valve member includes a stem having a passage therethrough that communicates with an exhaust solenoid valve at one end and an exhaust port in the housing at the other end.

11. The control valve of claim 10 wherein the stem moves with the valve member and is dimensioned to define an annular passage between an external surface thereof and the housing that communicates with the control volume.

12. The control valve of claim 11 further including a seal member interposed between the stem and the housing for selectively sealing the control volume from the exhaust port.

13. The control valve of claim 8 wherein the common exhaust is centrally located in the housing for communicating with the solenoid valve assembly.

14. The control valve of claim 8 wherein the solenoid valve assembly is a non-flow through arrangement wherein only one end thereof is in communication with system flow.

\* \* \* \* \*